(12) United States Patent (10) Patent No.: US 7,143,094 B2
Arroyo et al. (45) Date of Patent: Nov. 28, 2006

(54) METHOD AND APPARATUS FOR ENSURING DATA CONSISTENCY AMONGST A PLURALITY OF DISPARATE SYSTEMS HAVING MULTIPLE CONSUMER CHANNELS

(75) Inventors: Jorge A. Arroyo, Carmel, IN (US); Paul McDaid, Monkstown (IE); David U. Shorter, Lewisville, TX (US); Filip J. Yeskel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 09/908,523

(22) Filed: Jul. 18, 2001

(65) Prior Publication Data

US 2003/0018655 A1 Jan. 23, 2003

(51) Int. Cl.
*G06F 17/30* (2006.01)
(52) U.S. Cl. ............... 707/10; 707/102; 707/104.1; 709/203; 709/219
(58) Field of Classification Search ............... 707/200, 707/203, 10, 102, 104.1, 219
See application file for complete search history.

(56) References Cited

U.S. PATENT DOCUMENTS 5,974,238 A * 10/1999 Chase, Jr. ............... 707/203

6,169,794 B1 * 1/2001 Oshimi et al. ............... 707/200
6,345,245 B1 * 2/2002 Sugiyama et al. ............ 707/10
2003/0023759 A1 * 1/2003 Littleton et al. ............ 709/248

* cited by examiner

*Primary Examiner*—Leslie Wong
(74) *Attorney, Agent, or Firm*—Akerman Senterfitt

(57) ABSTRACT

The present invention describes a method and system for ensuring data consistency amongst a plurality of disparate computing systems that communicate in order to provide an electronic transactional service. Information or data that is common between various databases associated with each of the disparate systems can be identified and monitored during communication. Once the common data gets modified, the modified data can be converted to a format compatible with all the other databases. All the other databases can then be updated to ensure that the modified data is consistent amongst the databases of the various disparate systems. In one aspect of the invention, adapters interfacing with each disparate computing system can identifications to common data. The adapter can communicate the modification to a central data control point (DCP), which can then update all other databases with the modification. During the update, the DCP can propagate the modification to adapters communicating with the databases of other application vendor product systems.

35 Claims, 4 Drawing Sheets

METHOD AND APPARATUS FOR ENSURING DATA CONSISTENCY AMONGST A PLURALITY OF DISPARATE SYSTEMS HAVING MULTIPLE CONSUMER CHANNELS

BACKGROUND OF THE INVENTION

1. Technical Field

The present invention relates to the field of electronic commerce, and more particularly, to a method and apparatus for ensuring data consistency amongst a plurality of disparate computing systems.

2. Description of the Related Art

The pervasiveness of the Internet has allowed companies to exploit electronic communications to engage in what is commonly known as e-Business activities with their customers. E-business involves conducting business on the Internet and not only includes buying and selling goods and services, but can also include servicing customers and collaborating with business partners. To accommodate this vast range of activities, companies utilize a variety of channels for interacting with Web sites that offer e-Business activities.

A channel is a particular communication medium or a logical medium that can be used to offer a subset of activities, the conglomeration of which form the e-Business activity. For example, a channel for providing book reviews can be a subset of book selling activities in a book selling e-Business. Each channel can support various modes of access. For example, a book review channel can provide modes of access to the book selling e-Business activity through Web browsers and wireless devices such as wireless telephones and personal digital assistants (PDA's). Notably, as demand for e-Business activities increases, so does the need to provide additional channels to accommodate a variety of e-Business activities.

A large number of vendor products have been developed to provide additional channels that can accommodate a variety of e-Business activities. Many vendor products can support one or more limited channels and are typically targeted towards specialized activities within a particular industry. Still, in order to diversify the number of channels available for providing a variety of activities, a company has to purchase, install and operate multiple vendor application products. Diversification is eminent since no singular vendor product provides a complete solution capable of supporting all the e-Business activities within a particular industry.

These vendor products have typically been developed independent of other vendors and in a piecemeal fashion to meet existing customer demand. These vendor solutions which are independently developed for supporting different channels and which have different architectures are called "disparate systems." Significantly, disparate systems make it very difficult to integrate diversified e-Business solutions.

Referring to FIG. 1, there is shown an exemplary conventional disparate e-Business solution having a Customer Relationship Management (CRM) system. The CRM system can be a suite of products that can be used to provide the infrastructure necessary for implementing channel diversification for supporting customer related activities. The CRM system 100 that can be used for identification, acquisition, and retention of customers. The CRM system 100 can include application vendor products 135, 140, 145 and 150. Each of the application vendor products 135, 140, 145 and 150 can have an associated database 160, 170, 180 and 190 respectively. Also, each of the application vendor support products 135, 140, 145 and 150 can have one or more access points (service access point) 105, 110, 115, 120, 125 and 130 for the channels offered by the e-Business system.

The application vendor support products 135, 140, 145 and 150 can supply CRM functionality to the e-Business solution by supplying a platform for offering services through one or more access point. For example, application vendor product Web/Kiosk support 135 can provide CRM functions through a web browser 105 and a kiosk 110 respectively. Application vendor product WAP/PDA support 140 can provide CRM functions through a PDA 115 and a WAP enabled phones 120 respectively. Application vendor product call center support 145 can provide CRM functions through a call center 125. Application vendor product email support 150 can provide CRM functions through an email channel 130. The application vendor product can include a computer, software necessary to provide the services offered by the channel, and associated databases. The databases can act as a repository for stored information such as customer records and transaction information.

While the databases 160, 170, 180 and 190 can contain information about individual customers, no method exists to ensure that information is consistent amongst the various databases 160, 170, 180, 190 of the corresponding application vendor products 135, 140, 145, 150, respectively. If a customer contacts the call center and changes their address, the old address would still be reflected in the other application vendor product databases. For example, if a customer's address is changed in database 160 by application vendor product 135, the database 170, 180, 190 will not reflect this change. Hence, application vendor products 140, 145, 150 will not have updated values of the address for that customer.

Notably, even though the application vendor products, 135, 140, 145, 150 each supply CRM functionality to the e-Business solution, none of the application vendor products by itself, provides the full range of CRM support desired nor does each support the full range of channels desired. As a result, there will always be some database supporting a vendor application product that does not have the corresponding address change. Accordingly, a need arises to ensure data consistency amongst the databases 160, 170, 180 and 190.

Typically, the greater the number of channels, the greater the number of disparate systems that have to be integrated to support diversification and hence, the greater the problems associated with data consistency. Many attempts have been made to solve the problem of data consistency that occurs with disparate systems. One attempt includes utilizing an e-Business solution from a single vendor. Utilizing an e-Business solution from a single vendor ensures data consistency since all products used to implement the e-Business solution is compatible with each other and can freely exchange data. Another attempt includes utilizing a standardized system in which the components can be fully integrated. Notwithstanding, in reality, there are no single vendors and standards available that can provide an e-Business solution having adequate channel diversity necessary to meet the growing demands. Hence, there exists a need to provide a method and system to ensure data consistency between these disparate systems used to provide adequate channel diversity.

SUMMARY OF THE INVENTION

The invention provides a method and apparatus for ensuring data consistency amongst disparate application vendor products in an e-business system. The method can include identifying updates to common data in the disparate application vendor products and converting the identified updates to individual data formats that are processable by corresponding individual disparate application vendor products. Common data includes data that is common amongst the disparate application vendor products. The identified update can be converted to individual data formats that can be processed by each of the disparate application vendor products. Corresponding disparate application vendor products can be updated with the common data that has been converted to individual data formats.

The step of Identifying the updates can include sending the identified updates to common data from the individual disparate application vendor products to a central data control point (DCP). Furthermore, the identified updates to common data can be identified by an adapter linked to individual disparate application vendor products. The updating step can include parsing the identified updates to common data to determine data values for the updates to common data for the individual disparate application vendor products. The determined values for the common data can be communicated to adapters linked to each of the individual disparate application vendor products. The updating step can include converting the determined common values to the individual data formats that can be processed by corresponding ones of the disparate application vendor products. The converting step can be accomplished by the adapter which can be communicatively link to tfhe individual disparate application vendor products. Databases associated with the individual disparate application vendor products can be updated.

In a further aspect of the invention, a method for ensuring data consistency amongst disparate application vendor products is disclosed. The method can include receiving an update message from an adapter, wherein, the update message can contain updated common data. Moreover, the update message can be associated with a disparate application vendor product communicatively linked to the adapter. The update message can be parsed to extract updated common data. The parsed common data can be formatted into another update message which can be transmitted to other application vendor products.

The step of receiving an update message can occur at a central data control point (DCP) that can be linked to an adapter. Furthermore, the update message received from an adapter can be communicated using a standard common message format. Messages communicated by the DCP to adapters interfaced to the disparate application vendor products can also use this common message format.

In a further aspect of the invention, a method for ensuring data consistency amongst disparate application vendor products in an e-Business system, can include identifying an update to common data in an individual disparate application vendor product. An update message can be formatted having the identified update to the common data. This formatted message can be transmitted to a DCP where it can be reformatted by the DCP. The reformatted message containing identified update to common data can be used to update other disparate application vendor products in the e-Business system. Updating the disparate application vendor products can include transmitting the reformatted message from the DCP to the disparate application vendor products. The formatted message and the reformatted message can be formatted using a common message format.

A further aspect of the invention provides a system for ensuring data consistency between a plurality of disparate application vendor products in an e-Business solution. The system can include an adapter communicatively linked to one of the disparate application vendor products. The adapter can have a monitoring component capable of monitoring common data. A messaging component within the adapter can be capable of formatting messages containing identified updated common data. A central control processor can be communicatively linked to the adapter, wherein the central control processor can parse the formatted message and extracting the updated common data. A message formatted can format update messages having the extracted common data. A message transmitter can transmit the formatted update messages to disparate application vendor products in the e-Business system. Each disparate application vendor product can be communicatively linked to an application vendor product. Each application vendor product can have an associated database that can store data including common data.

In yet a further aspect of the invention, there is disclosed a computer program having a plurality of code sections for ensuring data consistency between a plurality of disparate application vendor products, the code sections being executable by a machine for causing the machine to perform the steps of identifying updates to common data which occur in the disparate application vendor products. The identified updates can be converted to individual data formats which can be processed by corresponding individual disparate application vendor products. These corresponding individual disparate application vendor products can be updated with the converted updates. Common data includes data that is common amongst the disparate application vendor products.

A further aspect of the invention provides a machine readable storage having stored thereon, a computer program having a plurality of code sections for ensuring data consistency amongst disparate application vendor products in an e-Business system, the code sections being executable by a machine for causing the machine to perform the steps of receiving an update message from an adapter, wherein the update message contains updated common data. The update message has an association with a disparate application vendor product communicatively linked to the adapter. The update message can be parsed and updated common data extracted. The extracted common data can be formatted into another update message which can be transmitted to other application vendor products in the e-Business system.

BRIEF DESCRIPTION OF THE DRAWINGS

There are presently shown in the drawings embodiments of which are presently preferred, it being understood, however, that the invention is riot so limited to the precise arrangements and instrumentalities shown, wherein.

DETAILED DESCRIPTION OF THE INVENTION

The present invention provides a solution to the problem of data inconsistency between disparate systems by identifying data that is common between various disparate systems. A disparate system is one in which the subsystems or components that provide a partial solution are not tightly integrated so as to ensure full interoperability. For example, in an e-Business system that handles sales transactions, parameters such a customer name and a shipping address would be common amongst the various databases (subsystems) of each disparate system. Common data associated with each of the disparate systems can be identified and monitored during communication. Whenever there is a modification to common data in any of the disparate systems, the modified data can be converted to a format compatible with all the other databases. All the other databases can then be updated with copies of the modified data in order to ensure data consistent amongst various databases.

The solution to the problem with disparate systems provided by the present invention is advantageous since it allows new channels to be added while ensuring data consistency between the vendor products used to support the channel. Support for a new channel can be achieved by seamlessly adding a new application vendor product that supports the new channel or by seamlessly replacing an existing application vendor product with an application vendor product that supports the channel. Seamless addition or replacement with an application vendor product that supports a new channel can be achieved through the use of an adapter.

Figure 1:
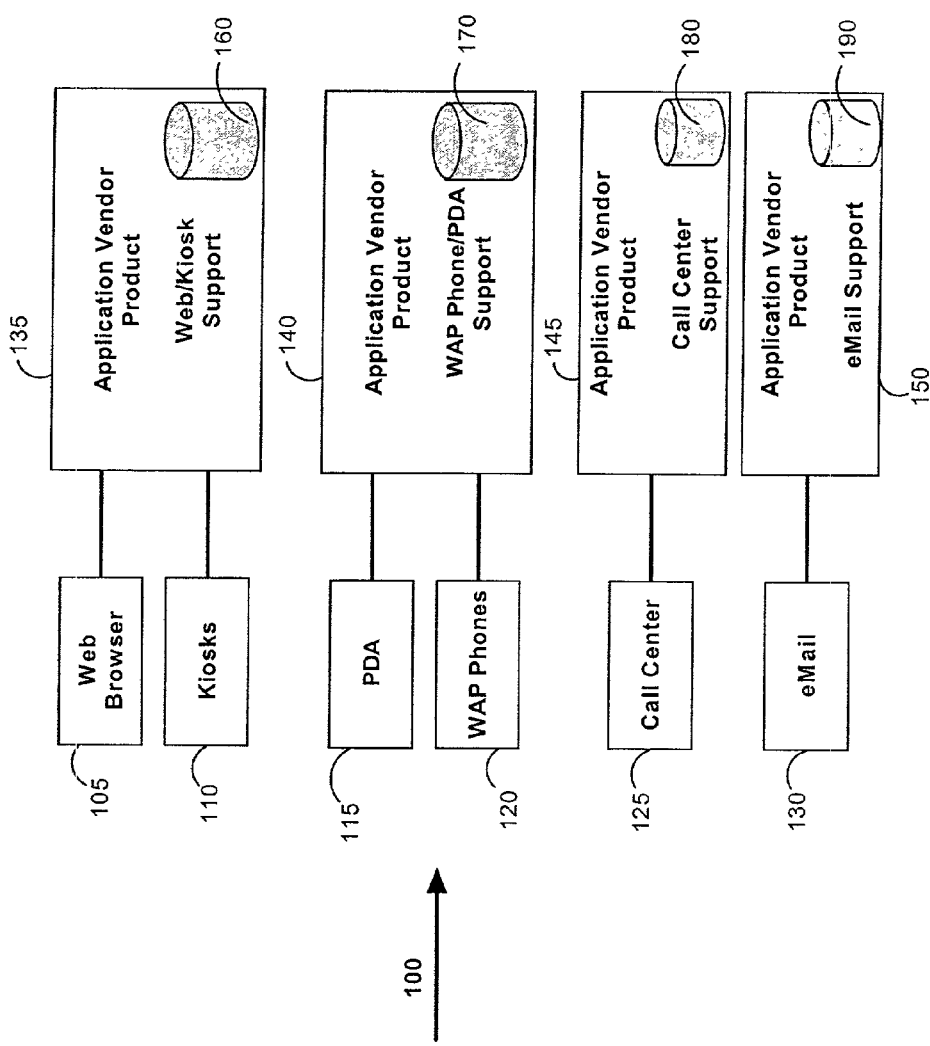
FIG. 1 is a block diagram of a exemplary conventional disparate e-Business solution.
Figure 2:
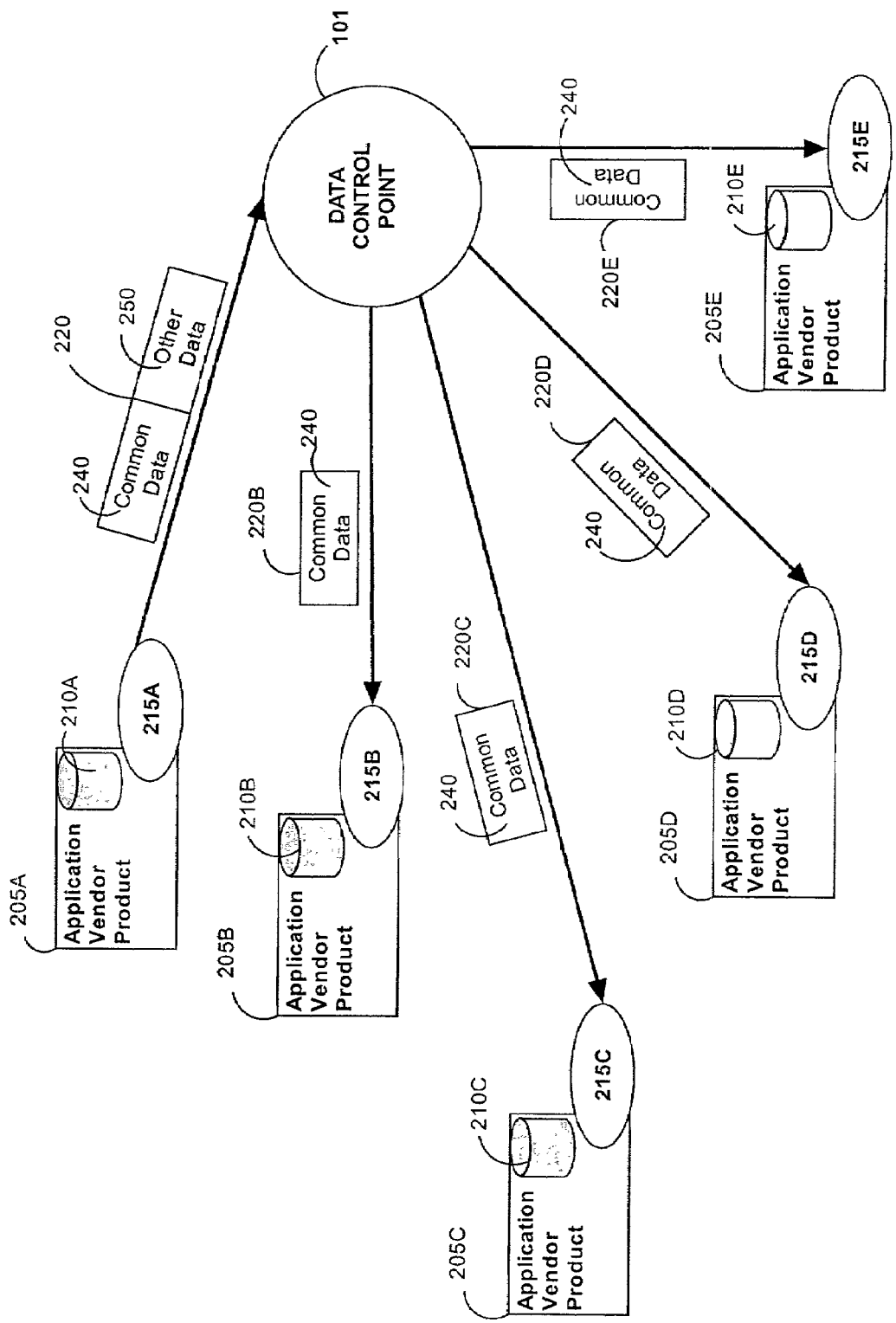
FIG. 2 is a high level block diagram of a improved system as in FIG. 1 according to the invent arrangements.

FIG. 2. is a high level diagram illustrating the update of disparate systems using adapters in accordance with the inventive arrangements. Application vendor products 205A, 205B, 205C, 205D, 205E are communicatively linked to a central data control point (DCP) 101 by adapters 215A, 215B, 215C, 215D, 215E, respectively. Each application vendor product 205A, 205B, 205C, 205D, 205E can have a respective associated database 210A, 210B, 210C, 210D, 210E.

An adapter, such as 215A, can be a software application an/or hardware which can be linked to an application vendor product through an interface for that product. An adapter can have a monitoring component and a messaging component. The monitoring component can contain software and/or hardware necessary to identify events that modify common data being communicated to an application vendor product. Through the common interface, the messaging component of the adapter can convert messages from a first message format which is compatible with an application vendor product, to a second defined message format and vice-versa. For example, adapter 215A can convert a message having a first message format compatible with application vendor product 205A, to a second message format, such as the message format of message 220. Message 220 can include common data 240 and other data 250. Other data 250 can include, for example, an identity of application vendor product 215A.

In addition to being linked to an application vendor product through a first interface, an adapter can be communicatively linked to a DCP 101 through a second interface. The second defined message format, such as the message format of message 220 utilized by adapter 210A, is compatible with the message format used to communicate with the DCP 101 through the adapter's second interface. The DCP 101 can be a module that can be integrated with application vendor products and can interface with adapters. The DCP 101 can have messaging components capable of receiving update messages from corresponding adapters. For example, a messaging component of DCP 101 can receive an update message 220 containing updated common data 240 from adapter 215A. Each message component can parse update messages, for example message 220, received from a corresponding adapter (215A) to determine updated common data 240 contained therein. Upon determining the updated common data 240 contained therein, the DCP 101 can format a message compatible with the second message format and communicate the second message to all of the adapters. For example, DCP 101 can format messages 220B, 220C, 220D, 220E having the updated common data 240 and send these formatted messages to adapters 215B, 215C, 215D, 215E, respectively. Notably, in one aspect of the invention, the second message format can be compatible with the XML specification. Hence, messages 220, 220B, 220C, 220D, 220E can be formatted to satisfy the requirements of the XML specification.

In accordance with the inventive arrangements, messages can be exchanged between adapters and the DCP 101 using asynchronous messaging. Asynchronous messaging is the communicating of a response to a message the gets sent at a later, often indeterminate time which therefore, lacks immediacy. Hence, the transaction does not occur in realtime. Realtime means the actual time during which a physical process occurs. Emails, letters and facsimiles (FAX) are examples of asynchronous messaging and can generally be used for requests when there is no immediate urgency. For example, a reply to an email can be sent days after a request. Notwithstanding, the invention is not so limited to asynchronous messaging and synchronous messaging can be utilized by the adapter and the DCP in other aspects of the invention.

While each of the application vendor products 205A, 205B, 205C, 205D, 205E can have an associated database 210A, 210B, 210C, 210D, 210E, respectively, the data models and structures among the databases of the various disparate application vendor products can vary, the attributes pertaining to a customer record are generally common. Consequently, a customer's personal information would be common data (240) that can be communicated amongst the various application vendor product databases. For example, first name, last name, customer identification number (such as, social security number), date of birth, etc. are all attributes of a customer that would be common amongst the disparate application vendor products.

The present invention can be applied to a Customer Relationship Management (CRM) system. As a result, the present invention eliminates the need to physically modify those application vendor products in an existing CRM system providing an e-Business solution. A CRM system can be a suite of software and hardware products that can be used to provide the infrastructure necessary for implementing diversified channels for supporting customer related activities. The CRM system can include call centers, Web personalization, and email services such as email marketing. Notably, as the CRM system expands to support channel diversification, data consistency between the various disparate systems is assured.

Figure 3:
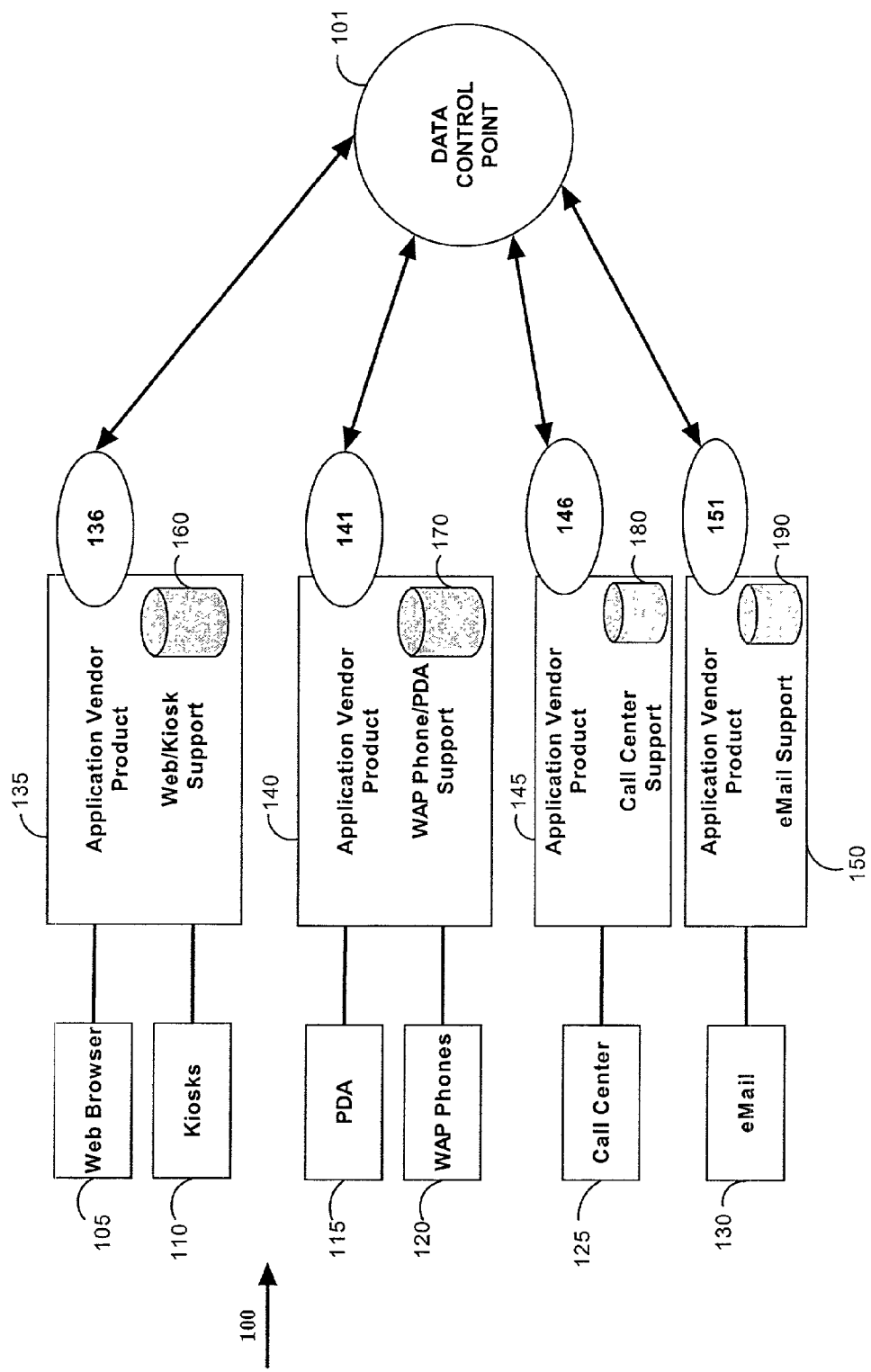
FIG. 3 is a block diagram of an improved system as in FIG. 1, wherein data consistency is assured according to the inventive aspects of the present invention.

Referring to FIG. 3, there is shown an improved e-Business solution that can ensure data consistency amongst application vendor products 135, 140, 145, 150 and their associated respective databases 160, 170, 180 and 190. In accordance with one inventive arrangement shown in FIG. 3, adapters 136, 141, 146, 151 can be respectively interfaced to each of the application vendor products 135, 140, 145, 150. The adapters 136, 141, 146, 151 are linked to and can communicate with data control point (DCP) 101.

In accordance with the invention, an adapter can be configured to determine when changes to common data occur within an application vendor product and its associated database. For example, adapter 146 can be configured to determine when a change to common data occur within application vendor products 145 and its associated database 180. Messages communicated to an application vendor product, such as 145, can be inspected by examining, for example, a message queue having messages pending for the application vendor product. The message queue can be located within the application vendor product and managed by the application vendor product. Messages placed on the message queue can be accessed by an adapter through the adapter interface previously described.

Adapter 146 can be configured so that its message component can be used to determine when changes are made to common data associated with application vendor product 145. Once changes to common data have been detected by the adapter 146, the adapter 146 can report the change to the common data by creating a message that can be sent to the data control point (DCP) 101. Data, including common data, in the message sent by the adapter 146 to the DCP 101 can be formatted, for example, as XML formatted data or other suitable formatted data. The message sent by adapter 146 can be communicated using asynchronous messaging. To ensure efficient delivery of the update message from the adapter 146 to the DCP 101, the data can be placed, for example, on a message queue for delivery to the DCP 101. This message queue can be managed by the DCP 101.

The DCP 101 can be configured to retrieve a message placed on its message by an adapter, through the former's message component. For example, DCP 101 can be configured to retrieve the message placed on its message queue by the adapter 146. Upon receiving the update message reporting the change to common data, the DCP 101 can parse the received message in order to determine the actual data to be updated. Once the updated data gets parsed from the update message, the DCP 101 can accordingly generate a message to notify the application vendor products of the updated data. Notifying the application vendor products can be achieved by sending an update message to the adapters linked to the application vendor products. The adapters can be configured to communicate the updated data to their respective application vendor products where the latter's associated databases can be subsequently modified.

For illustrative purposes, the common data can be defined to be a particular customer's address which needs to be changed to a new address. In this case, the DCP 101 can retrieve an update message containing the new address data from it message queue. To determine the new address, the DCP 101 can parse the new address data from the update message received from its message queue. In accordance with one aspect of the invention, once the actual new address data is determined by parsing, the DCP 101 can determine which application vendor products requires updates of the new address. The DCP 101 can send the newly updated address data to the those application vendor products for which it is determined that an update is required.

In accordance with a further aspect of the invention, the DCP 101 can be configured to identify the adapter 146 that placed the message on its message queue, and/or it associated database 189. Once this adapter's 146 identity gets determined, the DCP 101 can send updates of the new address to all the other adapters, for example, 136, 141, 151 and their respective associated databases 160, 170, 190 in the CRM. Alternately, once the DCP 101 parses the new address, the DCP 101 can send updates of the new address to all the adapters 136, 141, 146, and 151 in the CRM to ensure data consistency across all the application vendor products 135, 140, 145 and 150, respectively. In this regard, it might not be necessary to know the identity of the adapter 146. Adapters, for example, 136, 141, 151 can function in a manner similar to that described for adapter 146. Data contained in the messages sent by the CRM 101 can be formatted as an XML formatted data or other suitable data format.

The adapters can be configured to receive update messages from the DCP 101. Update messages containing updated common data communicated by the DCP 101 to an adapter, such as 151, can be placed on the message queue maintained, for example, by the DCP 101. After the DCP 101 places an update message destined for an adapter, example 151, on its message queue, the adapter 151 can retrieve the message from the message queue. The adapter 151 can be configured to translate or convert the received update message from a data format compatible with the DCP 101, here XML, to a data format compatible with the application vendor product 150. The adapter 151 can communicate the updated message to application vendor product 150 by placing the converted update message on the message queue. The database 190 associated with application vendor product 150 can be updated with the updated common data. At this point, both disparate application vendor products 145 and 150 have updated common data. A similar process can be used to provide the updated common data to application vendor products 135 and 140. Although the DCP 101 can maintain a separate message queue from the application vendor products and the adapters do not maintain a message queue, the invention is not so limited.

Figure 4:
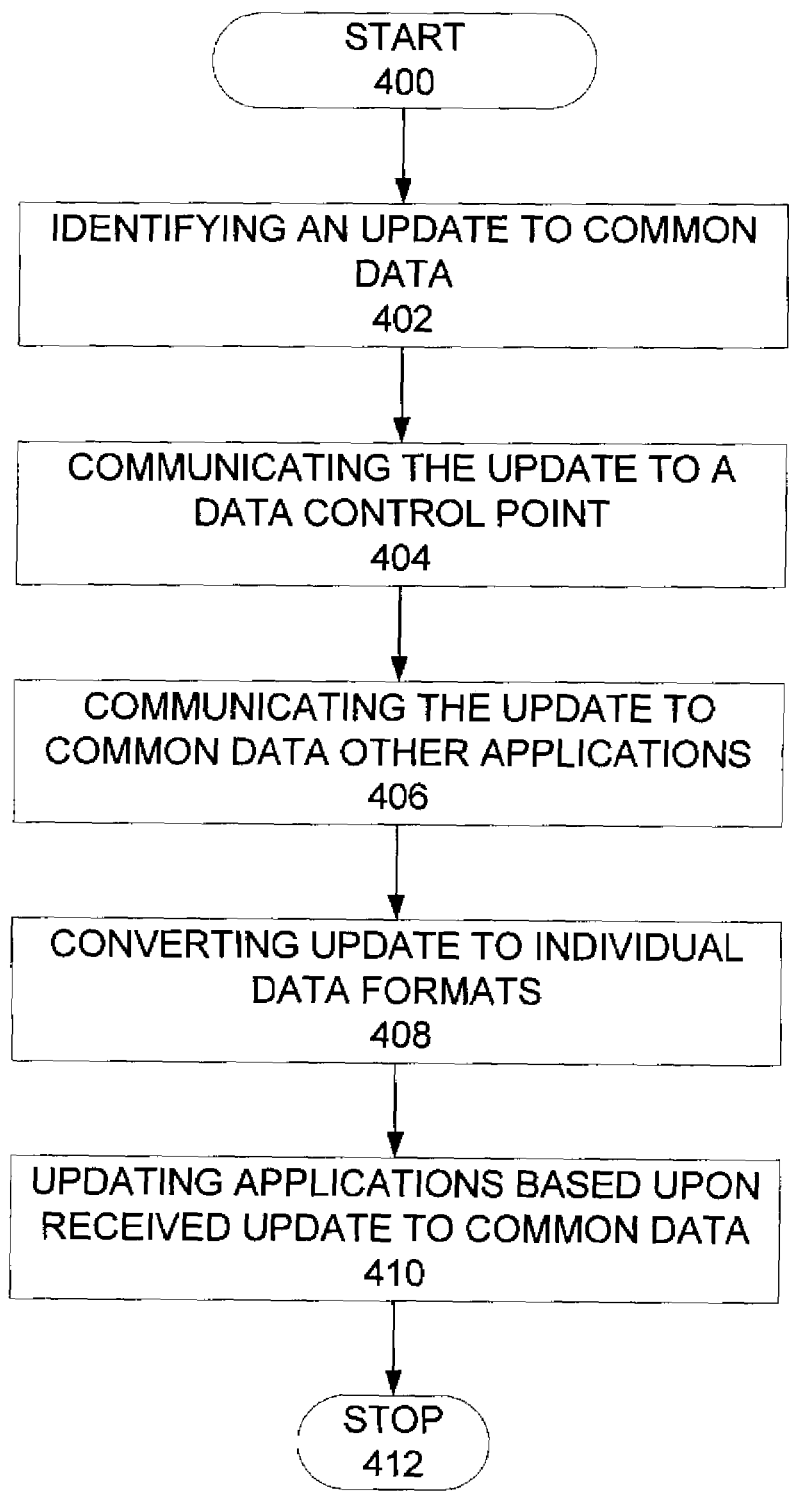
FIG. 4 is a flowchart of exemplary steps of a method to ensure data consistency between disparate applications configured to run on one or more computing systems.

Referring now to FIG. 4, the exemplary steps of a method 400 to ensure data consistency between disparate applications configured to run on one or more computing systems are illustrated in the form flowchart. The method 400 illustratively includes at step 402 identifying an update to common data contained in a message received by an individual disparate application and containing common and other data, where the common data defines data associated with each of the disparate applications. At step 404, the method illustratively continues with the communication of the update from the individual disparate application to a central data control point, the update being communicated in a message converted from a format associated with the individual disparate application to a format associated with the central data control point. The method also illustratively includes at step 406, communicating the identified update from the central data control point to different disparate applications. Additionally, the method includes at step 408 converting the identified update to individual data formats processable by different disparate applications, the conversion being performed by adaptors communicatively linked to respective ones of the disparate applications. The method further includes updating the different disparate applications based upon the converted update at step 410, the converted update having respective individual data formats which are processable by the individual disparate applications. The method concludes at step 412.

The present invention can be realized in hardware, software, or a combination of hardware and software. A method and system for ensuring data consistency amongst disparate systems in an e-Business solution according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described wherein, and which, when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

While exemplary systems and methods embodying the present invention can be shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

The invention claimed is:

1. A computer-implemented method for ensuring data consistency between disparate applications configured to run on one or more computing systems, the method comprising:
    identifying an update to common data contained in a message received by an individual disparate application and containing said common data and other data, said common data defining data associated with each of said disparate applications;
    communicating said identified update from said individual disparate application to a central data control point in a message converted from a format associated with said individual disparate application to a format associated with said central data control point;
    communicating said identified update from said central data control point to different disparate applications;
    converting said identified update to individual data formats processable by said different disparate applications, the conversion being performed by adaptors communicatively linked to respective ones of said disparate applications; and
    updating said different disparate applications with said converted update having respective individual data formats which are processable by said different disparate applications.

2. The method according to claim 1, wherein said identifying step is performed by an adapter communicatively interfaced to said individual disparate application, said adapter converting said message from the format associated with said individual disparate application to the format associated with said central data control point and communicating said message to said central data control point.

3. The method according to claim 1, wherein said central data control point communicates said update to said different disparate applications in messages containing said update.

4. The method according to claim 1, further comprising parsing said message communicated from said individual disparate application to said central data control point to determine data values for said update to common data for said different disparate applications.

5. The method according to claim 4, wherein said communicating said update comprises communicating said updates to adapters communicatively interfaced to each of said different disparate applications.

6. The method according to claim 5, further comprising converting said common values to individual data formats processable by different disparate applications.

7. The method according to claim 6, wherein said converting step further comprises, converting said identified updates to individual data formats at said adapters communicatively interfaced to said different disparate applications.

8. The method according to claim 6, further comprising updating databases associated with said said different disparate applications.

9. A computer-implemented method for ensuring data consistency amongst disparate applications configured to run on one or more computing systems, the method comprising:
    receiving at a central data control point an update message comprising updated common data and other data, said update message having been converted by an adapter from a format associated with a disparate application to a format associated with said central data control point and said update message having an association with said disparate application;
    parsing said update message at said central data control point and extracting said updated common data from said update message at said central data control point;
    formatting at said central data control point said extracted updated common data into another update message; and
    transmitting at said central data control point said another update message to at least one other application.

10. The method according to claim 9, wherein said central data control point is communicatively linked to said adapter.

11. The method according to claim 9, wherein said update message received from said adapter and said another update message are communicated using a common message format.

12. The method according to claim 9, wherein said transmitting step, comprises transmitting said another update message to an adapter communicatively linked to said at least one other application.

13. A computer-implemented method for ensuring data consistency amongst disparate applications running on one or more computing systems, the method comprising:
    identifying an update to common data in a message having a format associated with an individual disparate application, said common data defining data associated with said individual disparate application and other disparate applications;
    formatting an update message, said update message containing said identified updated common data;
    transmitting said formatted update message to a central data control point;
    generating a plurality of reformatted update messages by reformatting said transmitted formatted update message at said central data control point, each of said reformatted update messages being reformatted corresponding to different formats processable by said other disparate applications;
    conveying each of said reformatted update message to at least one of the other disparate applications; and updating other disparate applications with respective ones of said reformatted update messages.

14. The method according to claim 13, wherein said updating step further comprises transmitting said reformatted update message from said central data control point to said other disparate applications.

15. The method according to claim 14, wherein said reformatted update messages contain said identified update to common data.

16. The method according to claim 15, wherein said formatted update message and said reformatted update messages have a common message format.

17. A system for ensuring data consistency amongst disparate applications running on one or more computing systems, the comprising:
   an adapter communicatively linked to a disparate application, said adapter comprising a monitoring component for monitoring common data and a messaging component for converting messages containing identified updated common data from a first format associated with the disparate application to a second format; and
   a central data control point communicatively linked to said adapter, said data control point comprising a message parser for parsing messages converted from the first to the second format and a data extractor for extracting updated common data from the converted messages, a message formatter for formatting update messages with updated common data extracted from a received converted message, and a message transmitter for sending formatted update messages to other disparate applications.

18. The system according to claim 17, wherein an adapter is communicatively interfaced to each of said other disparate applications.

19. The system according to claim 17, further comprising a database, said database for storing data including said common data associated with at least one of said disparate applications.

20. A machine readable storage having stored thereon, a computer program having a plurality of code sections, said code sections executable by a machine for causing the machine to perform the steps of:
   identifying an update to common data contained in a message received by an individual disparate application and containing said common data and other data, said common data defining data associated with each of said disparate applications;
   communicating said identified update from said individual disparate application to a central data control point in a message converted from a format associated with said individual disparate application to a format associated with said central data control point;
   communicating said identified update from said central data control point to different disparate applications;
   converting said identified update to individual data formats processable by said different disparate applications, the conversion being performed by adaptors communicatively linked to respective ones of said disparate applications; and
   updating said different disparate applications with said converted update having respective individual data formats which are processable by said different disparate applications.

21. The machine readable storage according to claim 20, wherein said identifying step is performed by an adapter communicatively interfaced to said individual disparate application, said adapter converting said message from the format associated with said individual disparate application to the format associated with said central data control point and communicating said message to said central data control point.

22. The machine readable storage according to claim 20, wherein said central data control point communicates said update to corresponding disparate applications in messages containing said update.

23. The machine readable storage according to claim 20, further comprising causing said data control point to parse messages communicated from said individual application to said central data control point to determine data values for said update to common data.

24. The machine readable storage according to claim 23, wherein said communicating said update to disparate applications comprises communicating said updates to adapters communicatively interfaced to each of said disparate applications.

25. The machine readable storage according to claim 24, further comprising converting said common values to individual data formats processable by corresponding individual disparate applications.

26. The machine readable storage according to claim 25, wherein said converting step further comprises, converting said identified updates to individual data formats at said adapter communicatively interfaced to said individual disparate applications.

27. The machine readable storage according to claim 25, further comprising updating databases associated with said individual disparate applications.

28. A machine readable storage having stored thereon, a computer program having a plurality of code sections, said code sections executable by a machine for causing the machine to perform the steps of:
   receiving at a central data control point an update message comprising updated common data and other data, said update message having been converted by an adapter from a format associated with a disparate application to a format associated with said central data control point and said update message having an association with said disparate application;
   parsing said update message at said central data control point and extracting said updated common data from said update message at said central data control point;
   formatting at said central data control point said extracted updated common data into another update message; and
   transmitting at said central data control point said another update message to at least one other application.

29. The machine readable storage according to claim 28, wherein said central data control point is communicatively linked to said adapter.

30. The machine readable storage according to claim 28, wherein said update message received from said adapter and said another update message are communicated using a common message format.

31. The machine readable storage according to claim 28, wherein said transmitting step, comprises transmitting said another update message to an adapter communicatively linked to said at least one disparate application.

32. A machine readable storage having stored thereon, a computer program having a plurality of code sections, said code sections executable by a machine for causing the machine to perform the steps of:
   identifying an update to common data in a message having a format associated with an individual disparate application, said common data defining data associated with said individual disparate application and other disparate applications;

formatting an update message, said update message containing said identified updated common data;

transmitting said formatted update message to a central data control point;

generating a plurality of reformatted update messages by reformatting said transmitted formatted update message at said central data control point, each of said reformatted update messages being reformatted corresponding to different formats processable by said other disparate applications;

conveying each of said reformatted update message to at least one of the other disparate applications; and updating other disparate applications with respective ones of said reformatted update messages.

33. The machine readable storage according to claim 32, wherein said updating step further comprises transmitting said reformatted update message from said central data control point to said other disparate applications.

34. The machine readable storage according to claim 33, wherein said reformatted update message contains said identified update to common data.

35. The machine readable storage according to claim 34, wherein said formatted update message and said reformatted update message have a common message format.

* * * * *